UNITED STATES PATENT OFFICE.

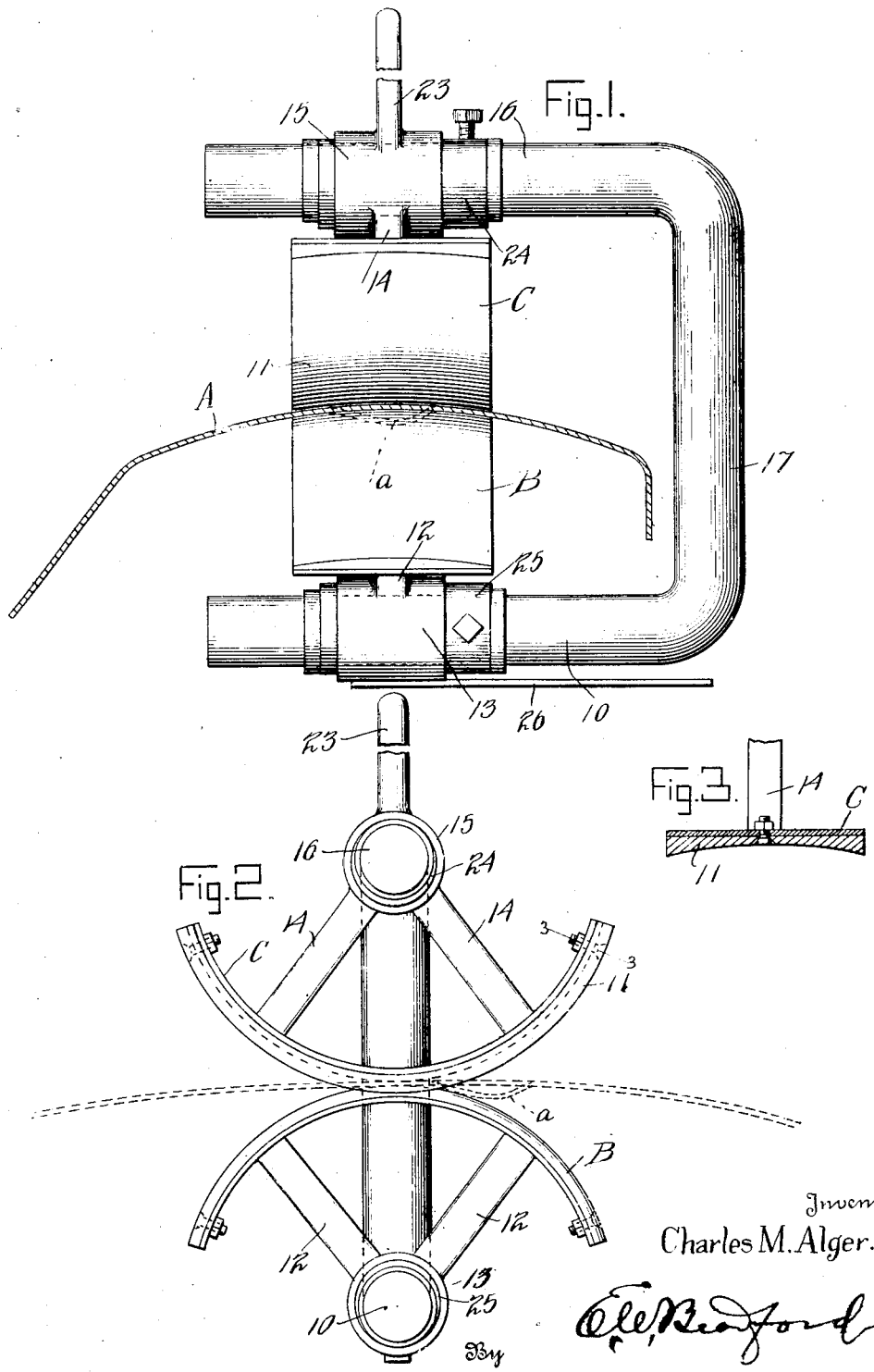

CHARLES M. ALGER, OF HANNIBAL, MISSOURI.

TOOL FOR REMOVING DENTS FROM AUTOMOBILE FENDERS.

1,403,887.        Specification of Letters Patent.    Patented Jan. 17, 1922.

Application filed June 28, 1920. Serial No. 392,235.

*To all whom it may concern:*

Be it known that I, CHARLES M. ALGER, a citizen of the United States, residing at Hannibal, in the county of Marion and State of Missouri, have invented certain new and useful Improvements in Tools for Removing Dents from Automobile Fenders, of which the following is a specification.

The object of my said invention is to provide a tool for use in garages and automobile repair shops whereby dents or other distortions in automobile fenders may be removed and said fenders restored to their original shape easily and in an inexpensive manner, all as will be hereinafter more fully described and claimed.

Referring to the accompanying drawings, which are made a part hereof and on which similar reference characters indicate similar parts, Figure 1 is a front elevation of a tool for the purpose stated, embodying my said invention, Figure 2 a side elevation thereof, and Figure 3 a detail cross section on the dotted line 3—3 in Figure 2.

In said drawings the portions marked A represent a fender, B the anvil or under member of the shaping tool, and C the upper member of said tool.

The fender A is shown merely to illustrate the method of operation, a dent being indicated therein as at point *a* and the parts of the tool in the position they occupy just as the work of removing the said dent is to begin.

The member B is shown as supported on a rod or bar 10 and is of a segmental shape and connected by a web or spokes 12 with a hub 13 which is mounted to rock on an eccentric sleeve 24 secured to the rod 10. The face of said member B is interchangeable and may be straight or of any curvature desired in cross section and is preferably of a shape to conform to the desired form of the fender in cross section. It may be a single properly shaped thickness of metal or wood or any other appropriate material, or built up of sections of wood, in the form of wheel felloes, or constructed in any other appropriate manner to conform to the normal shape of the fender. It will also be understood that it may be supported as shown, or any other type of support found appropriate may be employed.

The member C is likewise of segmental form having a web 14 or spokes formed integral with the hub 15 by which it is mounted on an eccentric sleeve 25 secured to a rod or bar 16 which extends parallel with the rod or bar 10. Said bar 10 has a member 17 extending at right angles therewith and forming a connecting member between the bars 10 and 16. The eccentric members 24 and 25 may be turned upon their respective bars 10 and 16 to adjust the members B and C to different gauges of the various fenders and secured by set-screws or other appropriate means. A lever 23 is mounted on the hub 15 for rocking the parts. A limiting member 26 is mounted on the outer side of hub 13 adapted to alternately contact with the opposite sides of the member 17 to limit the rolling distance of the members B and C. The face of the member C is preferably covered with material 11 that will not injure the varnish or paint of the fender, such as leather, hard rubber or some suitable composition.

In use the tool is mounted upon the fender, as indicated in the drawings, adjacent to the dent or distortion which it is desired to remove therefrom; the hand-nut 22 is turned to draw the supporting bars 10 and 16 toward each other until the members B and C are appropriately set upon the under and upper surfaces of the fender, respectively. The operator then, through the medium of the handle 23, rocks member C and brings member B forward keeping it in line with the dent, thus working the tool across the dent and bringing the metal up into its original position, restoring the form of the fender and without injury to the enameled surface thereof. The length of the segments is preferably such that they will separate when rocked to the limit determined by stop 26, after which one fender may be taken out and another one put in place for re-shaping.

Having thus fully described my said invention what I claim as new and desire to secure by Letters Patent, is:

1. A tool for shaping sheet metal comprising rocking formers having faces adapted to engage opposite sides of a fender, means whereby the formers may be operated and means to limit the rocking movement of the lower member, the length of the forming members being such that they separate on approaching the limit of movement, substantially as set forth.

2. A tool for restoring shape to automobile fenders, etc., comprising an anvil member appropriately supported and shaped to conform to the underside of the fender, a movable conforming member supported and adapted to be moving across the upper surface of the said fender, means for supporting and operating the same, and adjustable eccentric sleeves mounted between said movable members and said supports, substantially as set forth.

3. A tool for restoring fenders, etc., comprising fixed parallel bars or supports, a rotatable anvil member mounted on one of said bars, a rotatable conforming member mounted on the other of said bars, adjustable eccentric sleeves mounted on said bars and forming bearings for said anvil and conforming members, an operating handle formed integral with said conforming member and a travel-limiting member secured to said anvil member, substantially as setforth.

4. A tool for restoring shape to automobile fenders comprising a bar having a bent portion to form a support, an eccentric sleeve on the support, a rocking former on the sleeve, an operating handle on the former parallel to the bar, means for supporting a second former in opposed relation to the first and said sleeve being adjustable on the bar to vary the distance between the formers, substantially as set forth.

5. A tool for restoring shape to automobile fenders comprising a rigid C-shaped support having upper and lower bars, a rocking former on each bar, liners for building up the faces of the rocking members to conform to the upper and under sides of a fender, and means on one of the formers adapted to act on the enameled side of the fender without injury to the enamel, substantially as set forth.

6. A tool for straightening sheet metal articles comprising a C-shaped support having upper and lower bars, an oscillatory segmental former on each bar, and liners for building up the faces of the formers to give the desired shape to the work, substantially as set forth.

7. In a tool for straightening sheet metal articles, a rigid C-shaped support having upper and lower bars, oscillatory formers supported on said bars and adapted to contact with opposite faces of said articles, means for varying the distance between the working faces of said formers, liners for building up the faces to desired form, means lining one of said faces whereby cutting of enameled surfaces is avoided, a handle on one rocker, and means on the other to contact with the support for limiting movement in either direction, substantially as set forth.

8. A tool for straightening sheet metal articles comprising a pair of oscillatory formers, a rigid open-ended frame having upper and lower bars to support the respective formers whereby the work may be interposed endwise between the formers, a handle fixed to the upper former and projecting above the upper bar, a stop fixed to the lower former below the lower bar and adapted to contact with the web of the frame to limit movement of the lower former in either direction, substantially as set forth.

In witness whereof, I have hereunto set my hand and seal at Washington, District of Columbia, this 26th day of June, A. D. nineteen hundred and twenty.

CHARLES M. ALGER. [L. S.]

Witnesses:
E. W. Bradford,
E. K. Reichenbach.